(No Model.) 3 Sheets—Sheet 1.
A. MEKENNEY.
PLANTING MACHINE.
No. 328,597. Patented Oct. 20, 1885.
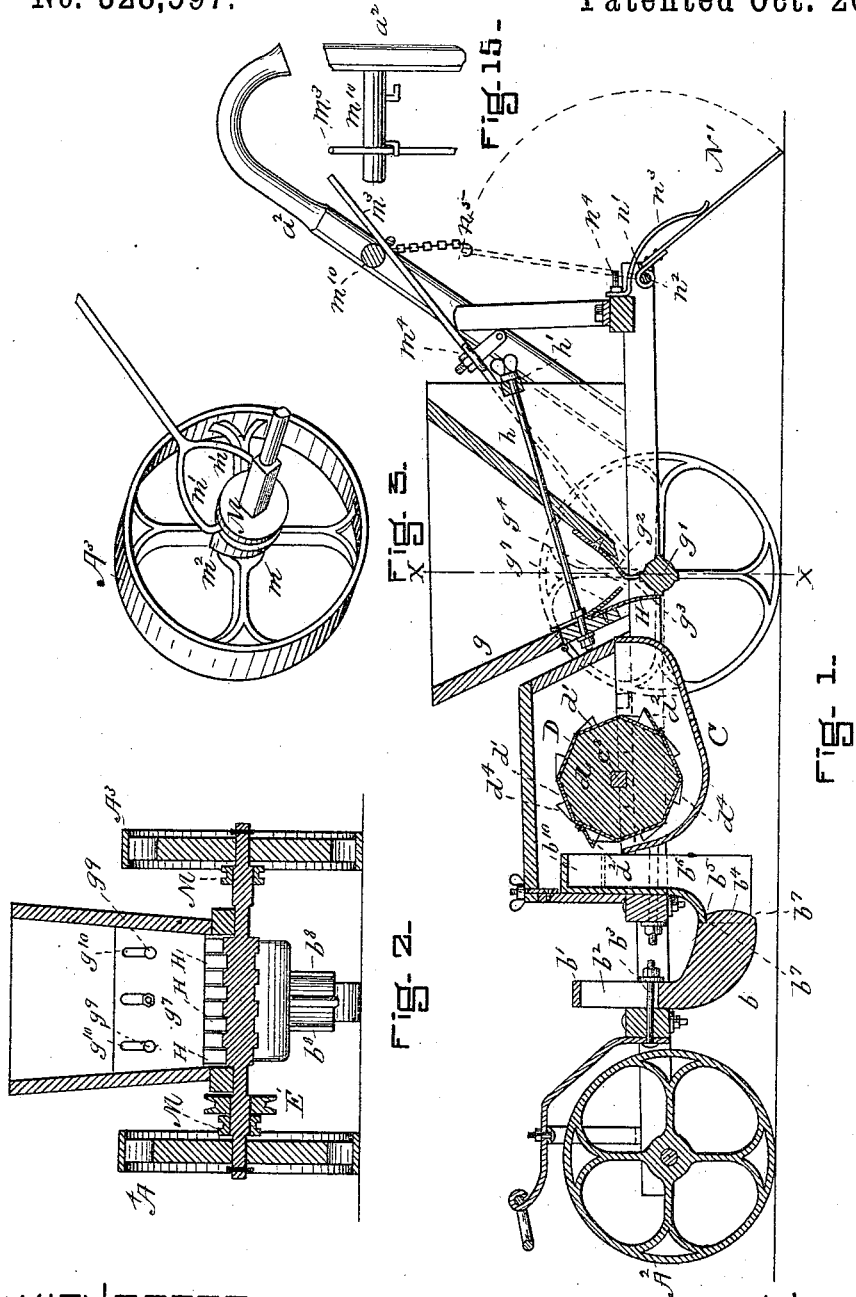
WITNESSES.
INVENTOR.

(No Model.) 3 Sheets—Sheet 2.
A. MEKENNEY.
PLANTING MACHINE.
No. 328,597. Patented Oct. 20, 1885.
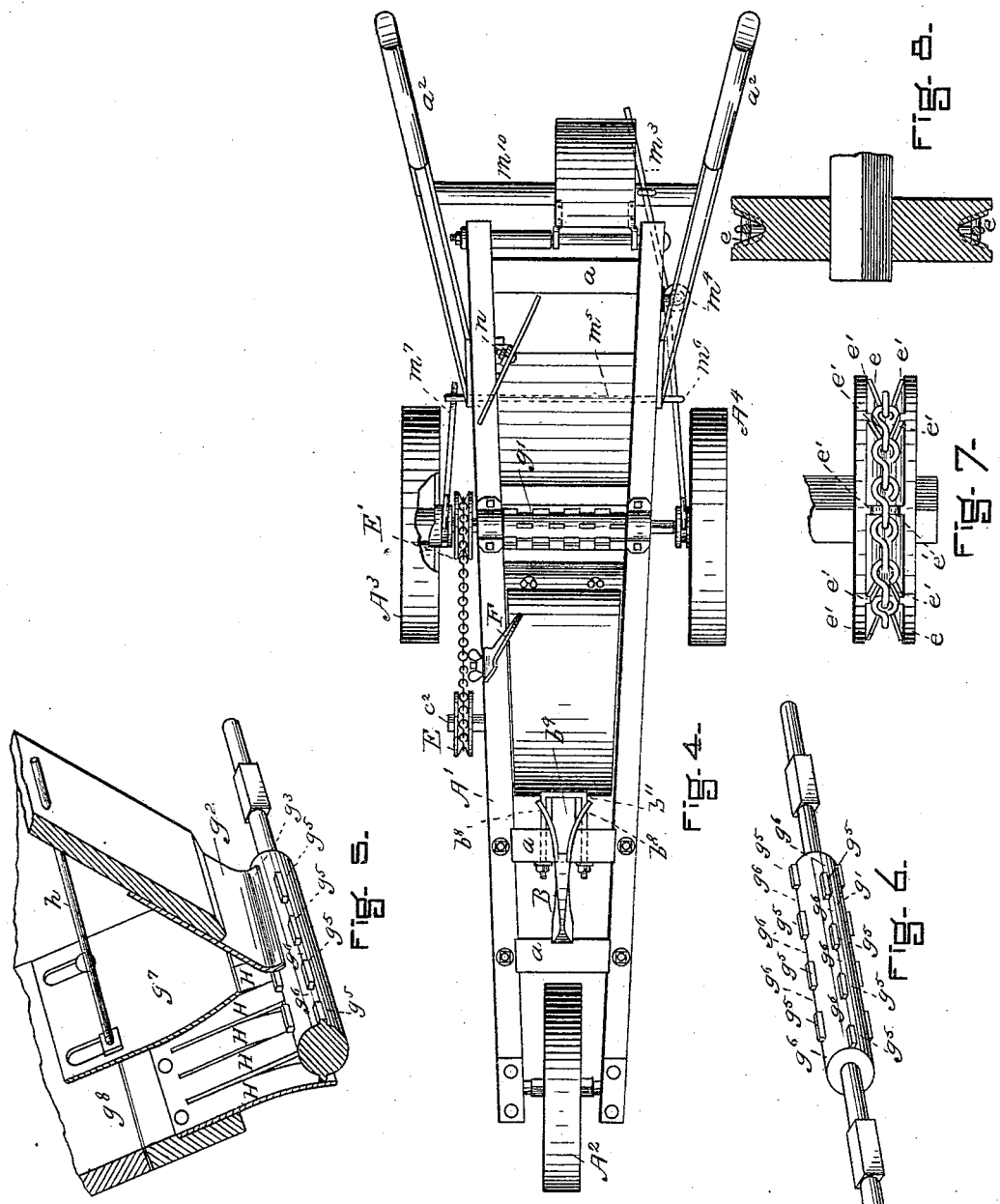

(No Model.) 3 Sheets—Sheet 3.
A. MEKENNEY.
PLANTING MACHINE.
No. 328,597. Patented Oct. 20, 1885.
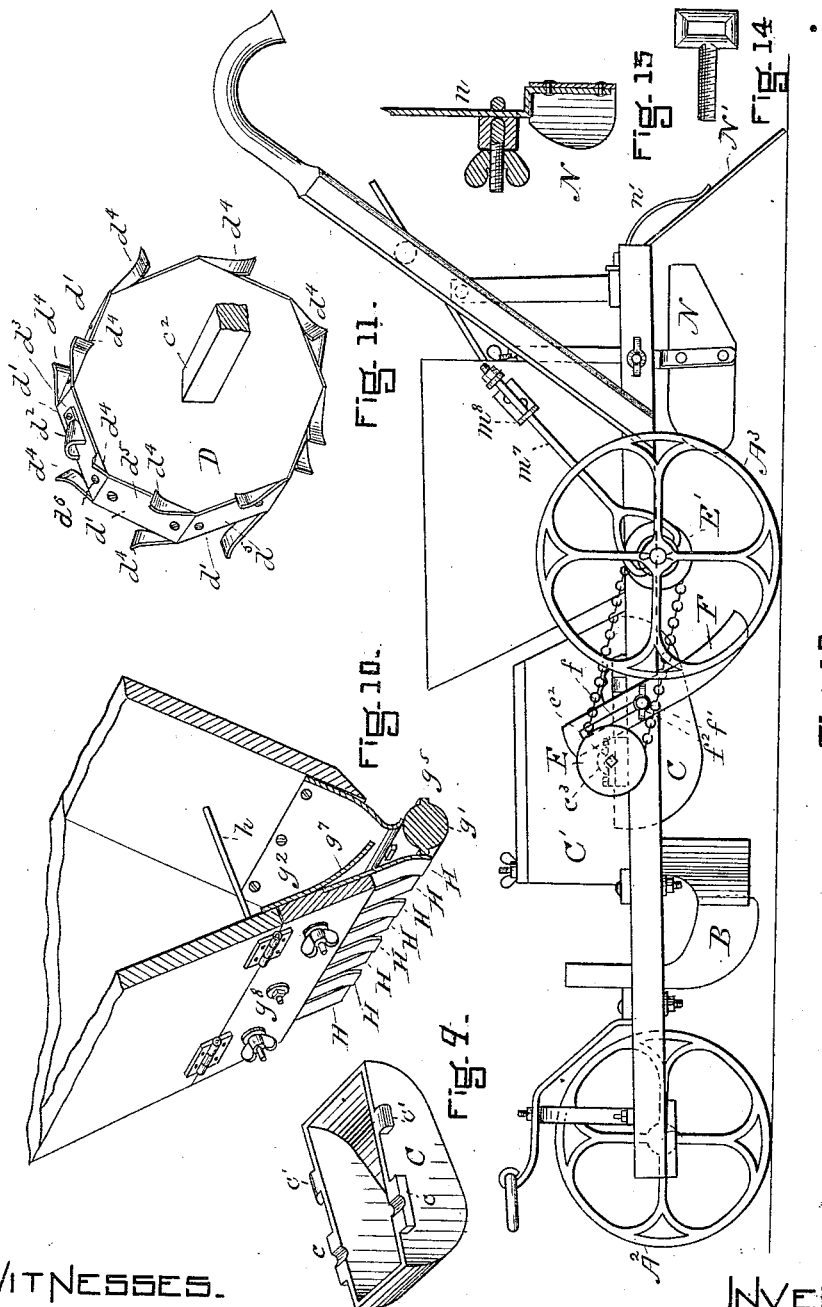
WITNESSES.
INVENTOR.

UNITED STATES PATENT OFFICE.

ALENDO MEKENNEY, OF MIDDLEBOROUGH, MASSACHUSETTS.

PLANTING-MACHINE.

SPECIFICATION forming part of Letters Patent No. 328,597, dated October 20, 1885.

Application filed November 13, 1884. Serial No. 147,826. (No model.)

*To all whom it may concern:*

Be it known that I, ALENDO MEKENNEY, of Middleborough, in the county of Plymouth, in the State of Massachusetts, a citizen of the United States, have invented a new and useful Improvement in Planting-Machines, of which the following is a full, clear, and exact description, reference being had to the accompanying drawings, forming a part of this specification, in explaining its nature, in which—

Figure 1 is a vertical central section of a machine containing the features of my invention. Fig. 2 is a cross-section on the line $x\ x$ of Fig. 1. Fig. 3 is a view of the clutch mechanism hereinafter referred to. Fig. 4 is a view in plan of the machine reversed. Fig. 5 is a view in perspective, showing the fertilizer-dropping mechanism. Fig. 6 is a view in perspective of the force-feed roll. Figs. 7 and 8 show the construction of the sheaves hereinafter referred to. Fig. 9 is a view in perspective of the seed-holding tray detached. Fig. 10 is a view in section and perspective of the fertilizer-feeding mechanism. Fig. 11 is a view in perspective of the seed-dropping roll. Fig. 12 is a view in elevation of the complete machine. Fig. 13 is a view in section of a blade or board for covering the fertilizer with earth, and means for fastening it to the frame of the machine. Fig. 14 shows a portion of the mechanism for fastening it in place. Fig. 15 is a detail view hereinafter referred to.

The invention relates to various features of arrangement and construction of devices for forming furrows or drills, depositing seed and fertilizing material, covering the seed and fertilizing material and compacting the soil thereon, all of which will be hereinafter especially referred to and described. It also relates to certain specific devices which will also be hereinafter set forth.

The invention comprises a plow, a seed dropping or depositing device, and devices for covering the seeds after they have been dropped and before the fertilizer has been applied, a fertilizer-distributer, and a covering and compacting mechanism.

Referring to the drawings, A A' represent the two side rails of the seeder, which are connected by cross-pieces $a$, firmly bolted to the side pieces. These side and cross pieces constitute the frame-work of the machine, which is supported at the front end by the wheel or roll $A^2$, and at the rear end by the wheels $A^3$ $A^4$. The frame-work supports or carries the various operative devices, and has at its rear end the guiding-handles $a^2$.

To the cross-pieces $a\ a$ is secured the plow B. The object of this plow is to make a furrow of any necessary width and depth, within which the seed may be deposited. It preferably is divided into two parts, and the front portion, $b$, has an upwardly-extended arm, $b'$, having a long slot, $b^2$, through which the bolt $b^3$ passes, which fastens it in place, and by which it is vertically adjustable. The rear end of this front section of the plow is provided with a tongue, $b^4$, which enters the socket or recess $b^5$ in the back section, $b^6$, of the plow, and the two sections are fastened together by a rivet. The corners $b^7$ are somewhat rounded, so that the rear section may have a slight play up and down upon the rivet to accommodate itself to inequalities, and to yield when subjected to severe strain. The extent of this movement is, however, comparatively slight.

The rear section may be of any desirable shape to form the furrow, and I have represented it as having the two sides or wings $b^8$, which diverge outwardly from each other, so as to cause the earth to be thrown outwardly from its path, and between these two outwardly extending or spreading arms is a recess, $b^9$, through which the seed is dropped, as hereinafter explained. This section has the upwardly-extending box $b^{10}$, which preferably is cast solid with it, and which is secured to a cross-piece of the frame by the clip $b^{11}$. The box is open upon the rear from the top to the bottom, and the space inclosed by it opens into the space between the two wings of the plow.

Immediately behind the plow is a tray, C, for holding the seed. This tray is preferably of cast-iron, and is supported upon the frame-work of the machine by the lugs $c\ c'$, which project therefrom. The front lugs, $c$, furnish a bearing for the shaft $c^2$, which operates the seed-roll, and the caps $c^3$, which are bolted to these lugs and to the frame-work of the machine, serve to hold the tray firmly in position.

The seed-feeding roll D comprises the block $d$, which preferably is octagonal in shape and is mounted upon the shaft $c^2$, adapted to be positively revolved, as hereinafter described. This block supports upon its flat surface or surfaces $d'$ one or more scoops or pockets, $d^2$, by which the seeds which have been deposited in the tray are lifted and carried to the box or chute $b^6$, through which they fall to the ground. These scoops or pockets preferably are made of zinc, tin, or other easily-shaped metal, and they are of such a shape that they pick up and hold a certain quantity of seed, and no more, and carry it until it reaches the proper delivery position. In Fig. 11 I represent a view of one of these scoops or pockets. They are secured in place upon the roll by means of the screws $d^3$, so that they may be easily removable and others of a larger or a smaller size substituted. They preferably are placed near the rear or back portion of each of the flat surfaces of the roll, in order that they may properly discharge their contents when the front edge of such flat portion shall be in a position to cause the seed to be guided into the box or chute; and I have arranged upon the surface of each flat section supporting a scoop or pocket the side guides, $d^4$, which serve to direct the course of the seeds after they leave the scoop or pocket and prevent their falling from the roll. These side guides I prefer to form from tin, zinc, or other easily-shaped metal in one piece with the plate $d^5$. This may easily be done by cutting the plate to provide the sections which form the guides, and then turning them out very nearly at right angles thereto, as shown in the drawings. This plate, with the guide, is then secured in place by the screw $d^6$ and the screw $d^3$, which also serves to secure the pocket or scoop in position.

It is obvious from what I have said that the roll may have as many sides and as many of the scoops or pockets as desired, and that they may be of any required size, so that seeds may be deposited in any quantity at any distance apart. If, for instance, the roll has but one pocket or scoop, then the distance between each deposit of seeds will be the circumference of the roll. If two pockets or scoops are used, then two deposits of seeds will be made for every revolution of the roll. If eight pockets or scoops are employed, then there will be a deposit at every eighth of a revolution.

The roll is positively revolved by means of the open sheave or pulley E at the end of the shaft $c^2$, and an open sheave or pulley, E', of like construction, on the shaft of the wheels $A^3$ $A^4$. These sheaves are of such construction that I can use an ordinary chain for transmitting power. To accomplish this each sheave or pulley has a V-shaped circumferential groove or recess, $e$, from which project, preferably at uniform distances apart, arms or lugs $e'$, which contract the size of the groove or recess and form stops or teeth which engage with the links of the chain. A very good view of the construction of these sheaves or pulleys is represented in Figs. 7 and 8.

Secured to the frame of the machine is the earth-covering blade F. It has a slot, $f$, through which the bolt $f'$, which fastens it to the frame, projects, and by which and the thumb-screw $f^2$ it is adjusted vertically. Its lower portion is curved or bent so that it is oblique to the line of movement of the machine, the lower inner edge being farther in from the side of the machine than its front rounded outer edge. This shape of the blade causes the earth thrown or moved outward by the plow to be thrown over upon the seed before the fertilizing material is dropped upon it.

The fertilizer spreader or dropper G has what I term a "force feed," and it is an improvement upon that described in my application for Letters Patent filed March 12, 1884, Serial No. 123,852. It comprises in substance a hopper, $g$, for receiving and holding the fertilizing material, a force-feed roll, $g'$, an agitator, $g^2$, having a scraper, $g^3$, and a device for regulating the feed of the fertilizing material. The ends of the force-feed roll form the axle or shaft for carrying the wheels $A^3$ $A^4$. The roll is located below the opening $g^4$ in the hopper, and it has the teeth or projections $g^5$, which are rectangular in shape, and are separated by spaces $g^6$, of about the same length as the teeth. The teeth are arranged in line upon the roll to alternate, so that one tooth of one line shall be in front of the space between two teeth of the next line. Preferably these teeth are solid and cast integral with the remainder of the roll. I find that this form of tooth is superior to that described in my said application, as I am enabled to obtain a more accurate feed thereby.

The scraping device is formed by bending the lower edge of the agitator downward and slightly backward, so that it shall come in contact with the surface of the force-feed roll, and shall free the same from anything that may have lodged thereon before the teeth shall enter the opening through which the fertilizing material escapes. The relation which this scraper bears to the roll is well shown in Fig. 1. The roll comes in contact with the edge of the scraper as it revolves, and it pushes it forward until it has lifted the same sufficiently to clear it, when the scraper springs back to its original position, so that not only is the roll scraped, but the mass of fertilizing material in the hopper is agitated by the movement of the spring-plate.

To adjust the size of the opening or exit $g^4$, partially closed by the roll, I use the spring-plate $g^7$, which is fastened to the hinged board or flap $g^8$ by the bolts $g^9$, which, passing through slots $g^{10}$ in the plate to the outside, permit the plate to be moved up or down, and to be then fastened in place by thumb-screws upon the outside of the hopper. This plate not only serves to adjust the size of the opening, but, in connection with the agitator, it serves to comminute the fertilizing material, because as the agitator-plate is moved out by the action of the roll it forces the fertilizing material in the throat of the hopper against the sharp edge of the plate $g^7$, thereby causing any lumps to be cut or pressed into small pieces.

To still further govern the feed of the fertilizing material, I use the spring plates or fingers H, which are fastened to the hinged board $g^8$. These spring plates or fingers are of the width of the teeth $g^5$ upon the force-feed roll. They are so arranged that they are alternately lifted by the teeth coming in contact with them—that is, as one line of teeth is revolved it throws outward every other spring-plate of the series, and those not thrown out enter the spaces $g^6$ between the teeth and remain there pressed to the roll until the next line of teeth comes in contact with them, when they are pushed out, and the plates previously moved return to the surface of the roll, and remain in contact therewith until the third line of teeth comes in contact therewith. The pressure with which these spring-plates is held to each roll may be varied by the movement in or out of the hinged board which supports them, and this movement is accomplished by means of the rod $h$, which is fastened to the hinged board, and which extends through the hopper and the cross-piece $h'$, and has at its outer end a screw and thumb-nut, whereby the spring-plates may be drawn against the roll with as much pressure as may be desired. The spring-plates bearing against the force-roll in the manner indicated permit only a very limited amount of fertilizing material to feed, which amount may of course be varied by the change in degree of pressure and the size of the opening; but in any event only the amount of fertilizing material that can occupy the space immediately in front of each tooth, and extending from the top of the tooth down to the roll, can be fed, so that a uniform and definite quantity of fertilizing material only is forced from the hopper. By this arrangement and construction of devices any fertilizing material, including ashes, hen-manure, &c., can be uniformly and continuously fed.

The driving-wheels $A^3$ $A^4$ revolve freely upon their axle, except when the clutch mechanism is thrown into gear therewith, and in order to obtain sufficient power to drive the force-roll and the seeder I fasten each wheel by a clutch to the shaft. These clutches are very simple in construction and very easily operated. They each consist of a collar, M, having a groove, $m$, for the reception of the yoke or arms $m'$, for moving them, and teeth $m^2$, arranged upon the outer surface, which have an incline upon one edge and a sharp or straight shoulder. These teeth or shoulders project so that the shoulders engage with the spokes of the wheel when the clutch is in engaging position, whereby upon the revolution of the wheel the spokes come in contact with the shoulders of the teeth and cause the shaft to be revolved. Upon a backward movement, however, of the machine the spokes ride up the inclines and push the clutch away, so that the roll is not revolved. These clutches are moved into and out of position by means of the lever $m^3$, which is a spring-rod pivoted or having a fulcrum upon the bolt $m^4$, and carrying at its end the yoke, which enters the recess in the clutch, and a rod, $m^5$, which is secured to the lever $m^3$ at the point $m^6$, extends through the frame of the hopper, and connects with another lever, $m^7$, upon the opposite side of the machine, which has a fulcrum at $m^8$.

It will be observed that the rod forming the lever is simply twisted once to form the pivot-hole—a very cheap and effective construction. It will also be observed that as it is often necessary to draw the machine backward the various levers must not be rigid, but must spring frequently to permit the spokes of the driving-wheel to move the members of the clutch back out of position. By making the lever $m^3$ a spring-rod I am enabled to secure the clutches either in or out of engagement very easily and effectually by means of the hooks or holders $m^9$, attached to the cross-bar $m^{10}$ of the handles $a^2$, the spring of the rod being sufficient, when brought in contact with the hook, to hold the clutches away from or in contact with the wheels.

Immediately behind the fertilizer-distributer is the device for covering the fertilizer with earth and for compacting it thereon. This device comprises two elements, first, the spreading or leveling blade or board N, which is shaped to throw the earth from the side of the furrow upon the fertilizer, and is secured to the frame-work of the machine by the arm $n$, so as to be adjustable vertically in relation thereto, and be locked in place by means of a bolt and thumb-screw; and, second, the metal plate N', which is hinged at $n'$ to the cross-rod $n^2$, and which, when in use, is held down to its work by the spring $n^3$. This spring swings upon the screw $n^4$, which fastens it in place, on and off the plate, so that the plate can be lifted upon its pivot to the hook $n^5$ when it is not in use. The plate is long enough to permit its lower edge to drag on the earth, and that edge is made substantially horizontal, and when the spring-pressure is applied to it it is held down with very considerable force, so that the earth which has been thrown upon the fertilizing material by the blade or board N is spread quite evenly and also compacted, and in this respect the plate takes the place of the ordinary roll.

The guides $d^4$ and the pockets or scoops $d^2$ should be arranged in relation to each other, so that a clearance-space shall be left between the top of the pocket and the ends of the guides, in order to prevent the guides from acting to a certain extent as sides of the pockets, and thus increasing their size. This construction provides for a clearance-space, so that the scoop or pocket full of seeds only can be taken at a time.

Heretofore the fertilizing material has been covered with earth by means of two blades arranged to throw the earth from either side of the drill or furrow upon the fertilizer; but this construction is objectionable, because it very ofter happens that sods, roots, &c., are gathered by the two blades and dragged along, so that the seed furrow or drill is entirely obliterated, instead of being covered with earth regularly and uniformly, as by means of the mechanism herein described.

Having thus fully described my invention, I claim and desire to secure by Letters Patent of the United States—

1. In a planting-machine, the combination, with a revoluble block having one or more plane faces, of one or more scoops secured to such face or faces, and side guides, also secured to such face or faces, for directing the course of the seeds after they leave the scoop or scoops, substantially as described.

2. The combination, with a hopper provided with an agitator whose lower end is rearwardly bent to form a scraper, and with an adjustable spring-plate opposite to and inclining toward the agitator, of a feed-roll having lines of teeth upon it, said teeth being so arranged that one tooth of one line shall be in front of the space between two teeth of the next line, a series of spring-plates, of a width corresponding to the width of the teeth, secured to a hinged plate of the hopper, and suitable means for adjusting the hinged plate and spring-plates in relation to the roll, substantially as described.

3. The combination, with driving-wheels $A^3 A^4$ of the machine, of a clutch mechanism mounted on the shaft of said wheels, consisting of a collar, M, having a groove, $m$, for the reception of the actuating mechanism, and an inclined shoulder, $m^2$, said mechanism so arranged that the inclined shoulder will engage with a spoke of the wheel when the machine moves in a forward direction, and will be moved back out of operative position by the spoke when the machine moves in a backward direction.

4. The combination, with the fertilizer-dropper, of the vertically-adjustable spreading-blade N, hinged leveling and compacting plate N', and swinging spring $n^3$, substantially as described, and for the purposes set forth.

Executed by me this 10th day of November, A. D. 1884, at Boston, Massachusetts.

ALENDO MEKENNEY.

Witnesses:
   E. A. PHALEN,
   J. M. DOLAN.